Jan. 20, 1970

B. G. WILLIS 3,490,502

PORTABLE GROOVING MACHINE

Filed Oct. 11, 1965

BOBBY G. WILLIS
INVENTOR

BY
BUCKHORN, BLORE, KLARQUIST & SPARKMAN
ATTORNEYS

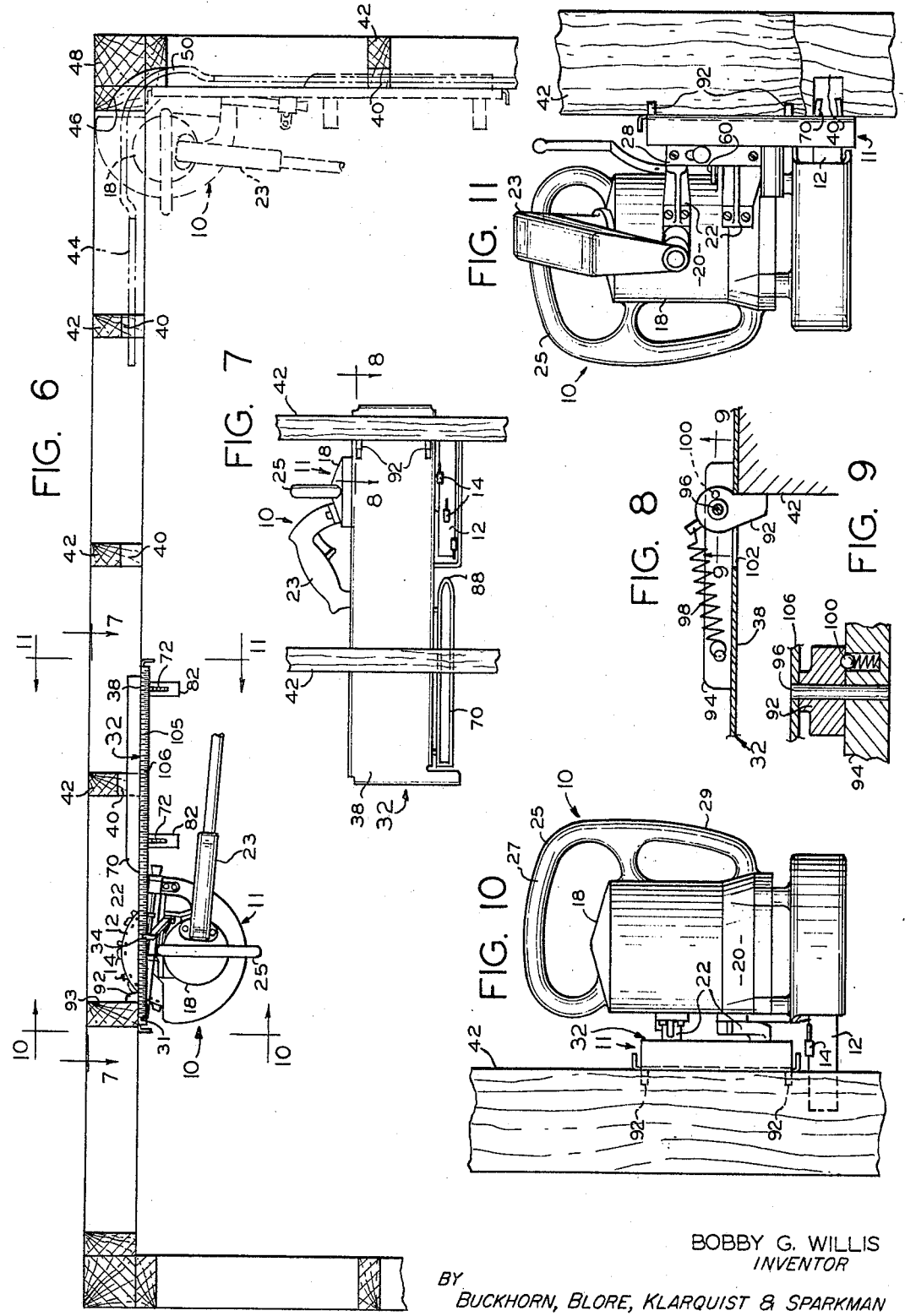

United States Patent Office 3,490,502
Patented Jan. 20, 1970

3,490,502
PORTABLE GROOVING MACHINE
Bobby G. Willis, Eugene, Oreg., assignor to Willis-Way Corp., Portland, Oreg., a corporation of Oregon
Filed Oct. 11, 1965, Ser. No. 494,413
Int. Cl. B27c 5/10, 5/00; B27g 13/00
U.S. Cl. 144—133
9 Claims

ABSTRACT OF THE DISCLOSURE

A motor 20 carries a grooving head 12 and is slidable on a guide 28 relative to a guide shoe 32 between a normal stud notching position and a forward corner stud notching position. A keying bar 70 is latchable in a retracted position and is normally in an operative position aligned with the grooving head and in a previously formed notch in a stud. Retractable squaring dogs 29 normally are held by detents 100 in positions projecting from the guide shoe to engage a stud to square the shoe relative to the stud, and are pivoted back to retracted positions as the notch is started.

Description

This invention relates to a portable grooving machine, and more particularly to a portable power tool for notching studs of buildings.

In installing electrical conduits in buildings under construction, notches are formed in studs for receiving the conduits. Notches in several studs are usually provided for the installation of each conduit, and such notches have been formed in the past by measuring for each notch, making several cuts for each notch, and knocking out the material between the cuts. This has been time consuming and costly. It would be desirable to make each notch with a single cut and to measure only the first notch to be cut.

An object of the invention is to provide a portable grooving machine.

Another object of the invention is to provide a portable power tool for notching studs of buildings.

A further object of the invention is to provide a portable grooving machine adapted to use a previously formed notch to index the machine in making the next notch.

A still further object of the invention is to provide a portable grooving machine having a keying bar movable from a retracted position relative to a guide shoe of the machine to an operative position in a previously formed notch in a stud to support the machine at the desired height to cut the next stud.

Yet another object of the invention is to provide a portable grooving machine which squares itself on a stud prior to cutting a notch in the stud.

Another object of the invention is to provide a portable grooving machine in which a power unit carrying a grooving head is adjustable relative to a guide shoe thereof to provide a selected depth of cut and the power unit is also slidable along the guide shoe to a position in which the head projects beyond the guide shoe in a position adapted to notch corner studding.

The invention provides a portable grooving machine having a power unit provided with a grooving head and mounted on a guide shoe. Preferably the power unit is mounted slidably on a guide which is hinged to the guide shoe and is adapted to be fixed to the guide shoe in a selected position of adjustment of the head relative to the guide shoe for cutting a notch or groove of a desired depth. The power unit is normally latched to the guide in a notching position and after release thereof may be slid along the guide to a position in which the grooving head projects beyond the forward end of the guide shoe for notching corner studding. Preferably a bar is carried by the guide shoe for movement between a retracted position and an operating position extending along and in front of the guide shoe and in alignment with the grooving head for entering a previously formed notch and splining the grooving machine to that notch as the next notch is formed. There also is preferably provided a pair of vertically spaced feeler dogs for engaging a stud to be notched and squaring the grooving machine relative to that stud.

A complete understanding of the invention may be obtained from the following detailed description of a portable grooving machine forming a specific embodiment thereof, when read in conjunction with the appended drawings, in which:

FIG. 6 is a horizontal sectional view of studding being grooved or notched by the portable grooving machine of FIG. 1;

FIG. 7 is a front elevation view taken substantially along line 7—7 of FIG. 6;

FIG. 8 is an enlarged horizontal sectional view taken substantially along line 8—8 of FIG. 7;

FIG. 9 is an enlarged vertical sectional view taken substantially along line 9—9 of FIG. 8;

FIG. 10 is an enlarged elevation view taken substantially along line 10—10 of FIG. 6; and FIG. 11 is an enlarged elevation view taken substantially along line 11—11 of FIG. 6.

Figure 5:
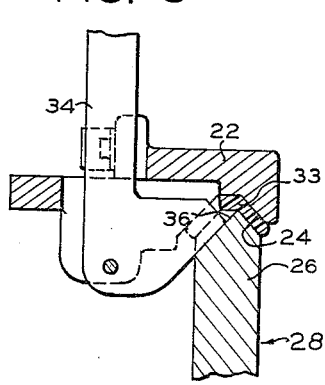
FIG. 5 is an enlarged vertical sectional view taken substantially along line 5—5 of FIG. 4.

Referring now in detail to the drawings, a portable grooving machine 10 shown therein and forming one embodiment of the invention includes a power unit 11 having a grooving head or disc 12, which preferably is of the construction disclosed and claimed in my copending application Ser. No. 424,548, filed Jan. 11, 1965. The grooving head has cutters 14 and is carried by and is rotatable by an electric motor 18 having a housing 20 rigidly bolted to a guide frame 22. The motor has a side handle 23 for pushing and a top handle 25 for lifting. The handle 25 has a top grip portion 27 and a side grip portion 29. The frames 22 have V-shaped guideways 24 therein which are bracketed and are slidable along parallel guide bars 26 forming integral portions of a hinged guide member 28. The guide member is pivotally secured by a pin 31 to aligned mounting lugs 30 of an elongated guide shoe 32 at the back side and the front end of the guide shoe. Each guide frame 22 has an antifriction liner 33 (FIG. 5) in the guideway 24.

Figure 4:
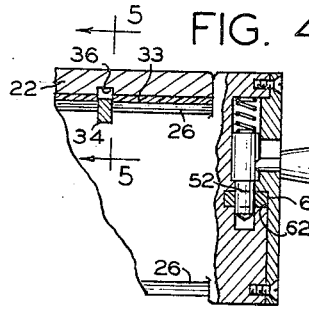
FIG. 4 is an enlarged vertical sectional view taken substantially along line 4—4 of FIG. 2.

A spring-pressed latch 34 (FIGS. 4 and 5) pivotally mounted on the frame 22 is urged toward a latching slot 36 in the upper one of the guide bars 26 to normally hold power unit 11 in a rearward position in which the grooving head 12 projects a selected distance from gauging face 38 of the guide shoe 32, in which position the machine is used to form notches or grooves 40 (FIG. 6) in vertical studs 42 of a building under construction, which notches are adapted to receive an electrical conduit 44. The latch 34 may be pivoted out of the slot 36, and the power unit 11 slid toward the front end of and farther beyond the gauging face 38 of the guide shoe 32 for forming deeper, arcuate notches 46 in corner studding 48 adapted to receive offset corner portions 50 of the conduit 44. A spring-pressed pin 52 (FIG. 4) slidably carried by the hinged guide member 28 is adapted to enter any selected one of holes 54, 56 and 58 in arcuate arm 60 which is rigidly mounted on the back of the guide shoe 32 and fits slidably in an arcuate guideway 62 in the guide member 28. With the pin 52 retracted, the hinged guide member 28 can be pivoted to position the head 12 to project three-quarters of an inch, one inch or one and one-quarter inches beyond the front of the gauging face 38, assuming the power unit 11 to be latched in its most rearward or notching position relative to the guide member 28.

Figure 1:
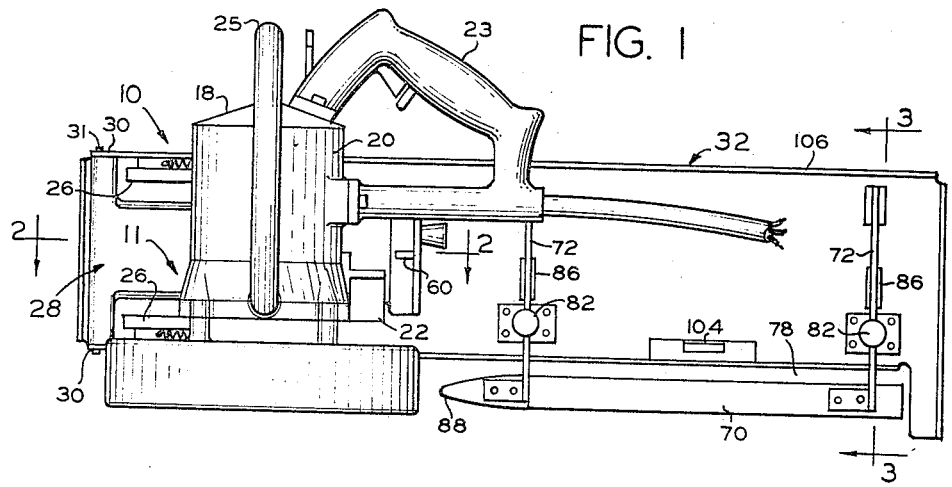
FIG. 1 is a rear elevation view of a portable grooving machine forming one embodiment of the invention.
Figure 2:
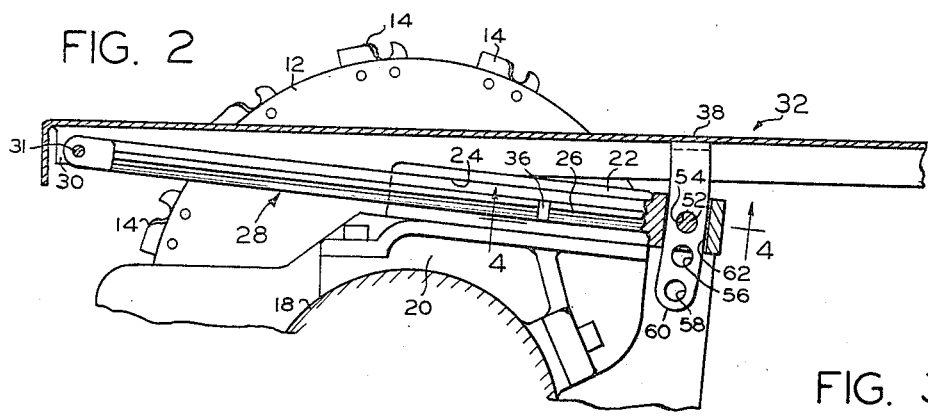
FIG. 2 is an enlarged horizontal sectional view taken substantially along line 2—2 of FIG. 1.
Figure 3:
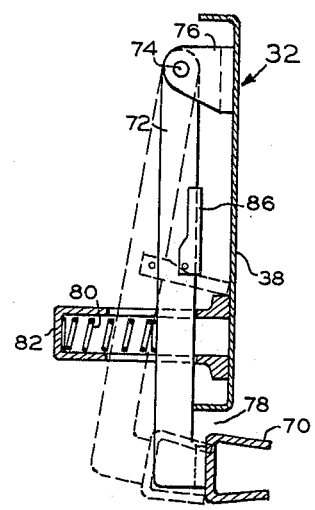
FIG. 3 is an enlarged vertical sectional view taken substantially along line 3—3 of FIG. 1.

A keying or splining bar 70 (FIGS. 1 and 3) extending along the guide shoe 32 for roughly the rear two-thirds of the guide shoe is carried rigidly by parallel arms 72 pivoted on aligned pins 74 carried by lugs 76 rigid on and projecting from the rear side of the guide shoe. The keying bar is urged through a cut out portion 78 toward an operative position extending laterally forwardly from the gauging face of the guide shoe by springs 80 seated in parallel, slotted tubular socket portions 82 rigidly secured to the back portion of the guide shoe. The springs 80 urge the keying bar toward its operative position shown in full lines in FIG. 3. The keying bar may be moved manually from its operative position to its retracted position shown in broken lines in which it does not extend beyond the front or gauging face 38 of the guide shoe and may be held in this retracted position by over-center latch arms 86 pivoted on the arms 72. The keying bar has a rounded, tapered nose portion 88 (FIGS. 1 and 6) at its front end to facilitate entrance of the keying bar into the notches 40 in the studs.

The lower side of the keying bar is aligned with the plane defined by the lower cutting extremities of the cutting teeth 14 of the grooving head 12 so that when the keying bar rests in the notch 40 in the stud 42 to the right, as viewed in FIG. 6, of the stud about to be notched, and the machine is held with the keying bar level, as may be determined by a pair of spaced, pivotal dogs 92 engaging a vertical, side face 93 of the stud to be notched just ahead of engagement of the stud by the grooving head 12. The dogs 92 (FIGS. 8 and 9) are mounted pivotally on lugs 94 of the shoe by vertical, aligned pins 96. The dogs are urged to operative positions projecting transversely from the gauging surface 38 of the shoe 32 by springs 98, and spring-pressed detents 100 tend to hold the dogs in their operative positions.

When both dogs engage the vertical side of one of the studs 42 and the gauging surface 38 engages the front edge of the stud, the grooving head 12 is horizontal and the keying bar 70 extends horizontally. With the grooving machine so positioned, it is then pushed to the left, as viewed in FIG. 6, and the grooving head cuts the notch 40 in the stud, the keying bar sliding in the previously cut notch to help support the grooving machine and to keep the grooving machine at the desired level. As the grooving machine is so pushed, the stud pivots the dogs 92 back through holes 102 in the shoe to retracted positions and the shoe 32 stays in engagement with the front edge of the stud being notched. A level 104 (FIG. 1) mounted on the back of the gauging shoe 32, which is generally in the form of a channel, also may be used to indicate that the keying bar and grooving head lie along a horizontal line.

If desired, latches (not shown) may be provided for holding the dogs 92 in retracted positions. A scale 105 (FIG. 6) calibrated in inches is provided on a top flange 106 of the shoe. The top flange 106 is positioned a predetermined distance, six inches, for example, above the bottom of the grooving head 12 so as to conveniently locate the grooving head that distance below a starting mark on the first stud to be cut. If desired, in place of the detents 100, the dogs 92 may be urged by fluid pressure devices (not shown) to the operative positions thereof.

Operation

To form the notches 40 (FIG. 6) in the studs 42 to receive the conduit 44, a mark is placed on the righthand stud six inches higher up the stud than desired for the notches in the studs. With the keying bar 70 latched in its retracted position, the grooving machine then is placed with the gauging surface 38 against the next stud to the right of the first stud to be notched with the dogs engaging the side of the stud to be notched. The machine then is moved vertically, if necessary, to place the top flange 106 at the level of the mark. Then the motor 18 is turned on, if necessary, and the grooving machine is pushed to the left to swing back the dogs and to form the notch 40 in the stud 42. The keying bar 70 then is unlatched and is spring pressed to its operative position. The operator then moves the machine to the left to move the keying bar into the newly formed notch 40 and both the dogs 92 against the next stud and then cuts the next notch by moving the machine to the left. In cutting the notches 40 in the studs 42 after the first notch has been cut, the keying bar fits in the last formed notch 40 and holds the machine at the desired level for cutting the next notch. Hence, only the initial or starting mark on the first stud that is to be notched need be made. The keying bar 70 is of such a length and is so spaced from the grooving head 12 that the keying bar is in the last formed notch several inches before the dogs 92 engage the next stud to be notched and remains in the last formed notch until after the next notch is completely cut and the grooving head is moved entirely out of that notch.

To notch the corner studding 48, the latch 34 is released and the power unit 11 is slid forwardly along the guide member 28 to the front end of the shoe 32. In this position the grooving head 12 projects forwardly beyond the front end of the shoe 32 and also extends farther beyond the gauging surface 38 of the shoe. Then, with the keying bar 70 in the last formed notch 40, the grooving head is pushed into the corner studding 48 and the arcuate notch 46 in the corner studding is formed. Then the power unit is retracted and latched in its normal notching position and the next stud is notched.

The above-described portable grooving machine serves to notch both the studs 42 and corner studdings 48 of an entire room with the notches all at a uniform height and with the only measurement being that for the height of the first stud to be notched. The machine may also be used to form grooves in solid decking as well as notching the studs, and has many other uses. The power unit is quickly and easily adjustable for different depths of cut, and is easily slid from its rearward, regular notching position to its forward, corner notching position.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a portable grooving machine:
 a power unit having a grooving head,
 a guide shoe carried by the power unit in a position in which the forward end of the guide shoe is in advance of the grooving head,
 a pair of spaced apart retractible feeler members carried by the guide shoe in positions ahead of the grooving head and normally projecting transversely of and beyond the guide shoe for engaging a side of a stud to be notched and squaring the grooving head relative to the stud, and a keying bar aligned with and extending behind the grooving head.

2. In a portable grooving machine:
 a guide shoe having a gauging face,
 a guide member extending along the guide shoe,
 and a power unit having a grooving head slidable along the guideway between a corner notching position in which the grooving head projects beyond one end of the guide shoe and a side notching position in which the grooving head projects beyond the gauging face at a point between the ends of the guide shoe.

3. In a portable grooving machine:
guide shoe means having a gauging surface and also having an elongated keying member projecting from the gauging surface,
a grooving head projecting from the gauging surface at a point spaced from the keying member and aligned with the keying member,
means for rotating the grooving head,
and a pair of handle means for supporting the guide shoe means and the grooving head in positions in which the gauging surface lies in a vertical plane and the grooving head and one of the handle means lying in a plane substantially parallel to the gauging surface, the other handle means lying in a vertical plane, substantially transverse to the gauging surface the keying member lie in a horizontal plane,
the keying member being of such a length and so positioned relative to the grooving head as to remain in a notch in a first stud during the entire notching operation of a second stud adjacent the first stud.

4. In a portable grooving machine:
a guide shoe having a gauging surface adapted to engage an edge of a stud,
dog means,
means mounting the dog means on the guide shoe for movement between a retracted position behind the gauging surface and a squaring position projecting transversely in front of the gauging surface for engaging a side of a stud,
means for urging the guide means toward the squaring position thereof,
and grooving means on the guide shoe for grooving a stud after the shoe has been squared relative to the stud by the dog means, the dog means includes a pair of laterally spaced, pivotal dogs,
and a pair of aligned pivot means on the guide shoe mounting the pivotal dogs on the guide shoe.

5. In a portable grooving machine:
a guide member,
a guide shoe,
means mounting the guide member pivotally on the guide shoe,
means for locking the guide member in one of a plurality of positions relative to the guide shoe,
a power unit mounted on the guide member for adjustment relative thereto between a forward position and a rearward position,
and a grooving head carried by the power unit and driven thereby.

6. The portable grooving machine of claim 5 including a slide mounted on the guide member and carrying the power unit.

7. In a portable grooving machine:
an elongated guide shoe having a gauging face,
an elongated keying bar,
a pair of arms mounting the keying bar on the shoe parallel to the guide shoe for movement between a retracted position at one side of the gauging face and a operative position projecting beyond the other side of the gauging face,
a grooving head,
means mounting the grooving head on the guide shoe in alignment with the keying bar when the keying bar is in the operative position thereof,
and means for driving the grooving head.

8. The portable grooving machine of claim 7 including overcenter latch means for latching the keying bar in its retracted position.

9. The portable grooving machine of claim 7 including a pair of slotted spring sockets secured to the guide shoe with the arms extending through the slots thereof, and a pair of springs in the sockets in engagement with the arms and urging the arms in a direction tending to move the keying bar to the operative position thereof.

References Cited
UNITED STATES PATENTS

| | | | |
|---|---|---|---|
| 1,585,535 | 5/1926 | Crogan | 143—43.1 XR |
| 2,246,761 | 6/1941 | Saliba. | |
| 2,353,794 | 7/1944 | Svikhart | 144—133 |
| 3,024,817 | 3/1962 | Johnson | 144—136 X |

DONALD R. SCHRAN, Primary Examiner

U.S. Cl. X.R.

143—159; 144—136

PO-1050
(5/69)

UNITED STATES PATENT OFFICE
CERTIFICATE OF CORRECTION

Patent No. 3,490,502  Dated January 20, 1970

Inventor(s) Bobby G. Willis

It is certified that error appears in the above-identified patent and that said Letters Patent are hereby corrected as shown below:

Column 5, lines 14 through 18, should read:

-- the keying member lie in a horizontal plane, one of the handle means lying in a plane substantially parallel to the gauging surface, the other handle means lying in a vertical plane, substantially transverse to the gauging surface, --

Column 6, line 17, "a" should be -- an -- .

SIGNED AND
SEALED
MAY 12 1970

(SEAL)
Attest:

Edward M. Fletcher, Jr.
Attesting Officer

WILLIAM E. SCHUYLER, JR.
Commissioner of Patents